July 24, 1962

W. R. MILLER 3,046,464

UNSYMMETRICAL STABILIZATION

Filed Jan. 6, 1960

INVENTOR.
WILLIAM R. MILLER

BY *Vernon H. Kalb*

ATTORNEY

United States Patent Office
3,046,464
Patented July 24, 1962

3,046,464
UNSYMMETRICAL STABILIZATION
William R. Miller, Lawrence Park, Pa., assignor to General Electric Company, a corporation of New York
Filed Jan. 6, 1960, Ser. No. 834
5 Claims. (Cl. 318—307)

This invention relates to speed regulated drive systems for dynamoelectric machines, and more particularly relates to stabilization of such systems.

In high gain speed regulated drive systems for dynamoelectric machines, it is customary to provide a feedback loop about amplifying elements or about a particular amplifying element in the drive system to stabilize the system upon variation in mechanical load on the dynamoelectric machine, tending to vary the speed of the machine. One common manner in which attempt is made to accompany such stabilization is to provide a negative feedback loop about one or more drive system amplifying elements to regulate an output characteristic of the one or more amplifying elements. Such a negative feedback loop usually contains resistive elements to attenuate by a predetermined amount the characteristic fed back and an element having a low impedance to a high frequency signal such as a step signal to decrease the time response to transient signals.

This type of feedback network is not altogether satisfactory for non-regenerating drives in the fact that there is no discrimination between positive and negative going variations in the electrical quantity applied to the feedback network. When static amplifying elements or other output elements capable of power flow in only one direction are used in a motor drive system, the system exhibits different characteristics upon removal of load than upon application of load to the dynamoelectric machine, due to the fact that the output element is incapable of positively reducing speed.

Inasmuch as the loop must have high gain to reduce steady state regulation, and only a small error signal at the input of the drive system is required to drive the power amplifier from maximum output to cut off, stability problems are presented.

Consider an electric drive system for a direct current motor wherein a signal indicative of the actual speed of the motor is compared with a speed reference signal and a resultant error signal is applied to the drive system to furnish a power input to the motor which will result in a desired speed of the machine. Assume that the motor is furnished power from a non-regenerating power amplifier. A sudden increase in load will decrease the speed of the dynamoelectric machine, resulting in a decrease in the speed indicative signal. When the motor decreases in speed, the speed indicative signal is fed back through the comparison circuit to increase the output of the power amplifier. Even a small error, due to high gain, will produce a surge of power to the machine, tending to over-accelerate the machine, thus making the speed of the machine increase above the desired value at a rapid rate. When the speed indicative signal exceeds the reference, the error reverses, shutting down the power amplifier. Since power flow cannot reverse, the power amplifier must wait in the "turned off" state for the motor to coast down, at which time it may surge on again. This action may therefore cause damped or even sustained oscillation at the slightest disturbance.

To prevent this phenomenon, a stabilizing network may be incorportated in the system to cushion or control the time rate of application of a step function feedback signal indicative of underspeed to the power amplifier. However, if load should now suddenly be removed from the dynamoelectric machine, a signal will be applied to the stabilizing network indicative of an increase in speed of the dynamoelectric machine as it accelerates, and the positive going signal applied to the stabilizing network will be presented the same time delay of application as a negative going feedback signal. This is undesirable inasmuch as the response of the drive is unnecessarily delayed for this particular condition of machine loading. When the load has suddenly been removed from the dynamoelectric machine and it is lightly loaded, it is desirable to effect immediate removal or reduction of electrical energy to the dynamoelectric machine to shorten the response time of the system in returning to the regulated value.

Various other types of arrangements have been utilized in an effort to obtain optimum response of speed regulated drive systems. By "optimum response" is meant minimum speed undershoot and overshoot during speed regulation and maximum stability. These various types of arrangements have been forced to strike a compromise between response time and stability inasmuch as high gain systems are not usually compatible with good stability.

In view of the deficiencies and limitations of the presently used feedback stabilizing networks in attempting to insure rapid yet stable regulation of speed and reduce speed undershoots and overshoots past a desired speed, it is an object of my invention to provide a new and improved stabilizing network for a regulated speed drive wherein the response time of the stabilizing network may be predetermined in accordance with different operating characteristics of the system, depending on whether output is being increased or decreased.

It is another object of this invention to reduce speed undershoot with applied load, and more specifically to reduce speed swings accompanying load removal to a minimum not heretofore attainable.

It is a further object of this invention to provide a feedback stabilizing network which provides a steady state feedback path together with controlled transient stabilizing feedback which is unsymmetrical in time with respect to oppositely directed load variations.

Briefly stated, these and other objects of my invention are accomplished in one form thereof by providing a negative feedback stabilizing network about a power amplifier supplying electrical energy to a motor in a regulated speed drive wherein load condition responsive elements are utilized to discriminate between opposite directions of variations in voltage output of a power amplifier to provide the proper magnitude and rate of stabilizing feedback in response to rapid or step changes in loading of the motor to obtain optimum time response and stabilization of the drive system upon variations in conditions of loading of the motor.

The novel features of the invention are set forth with particularity in the appended claims. The invention itself, however, both as to its organization and method of operation, together with further objects and advantages thereof, may best be understood by referring to the following description when taken in connection with the following drawings wherein:

Figure 1:
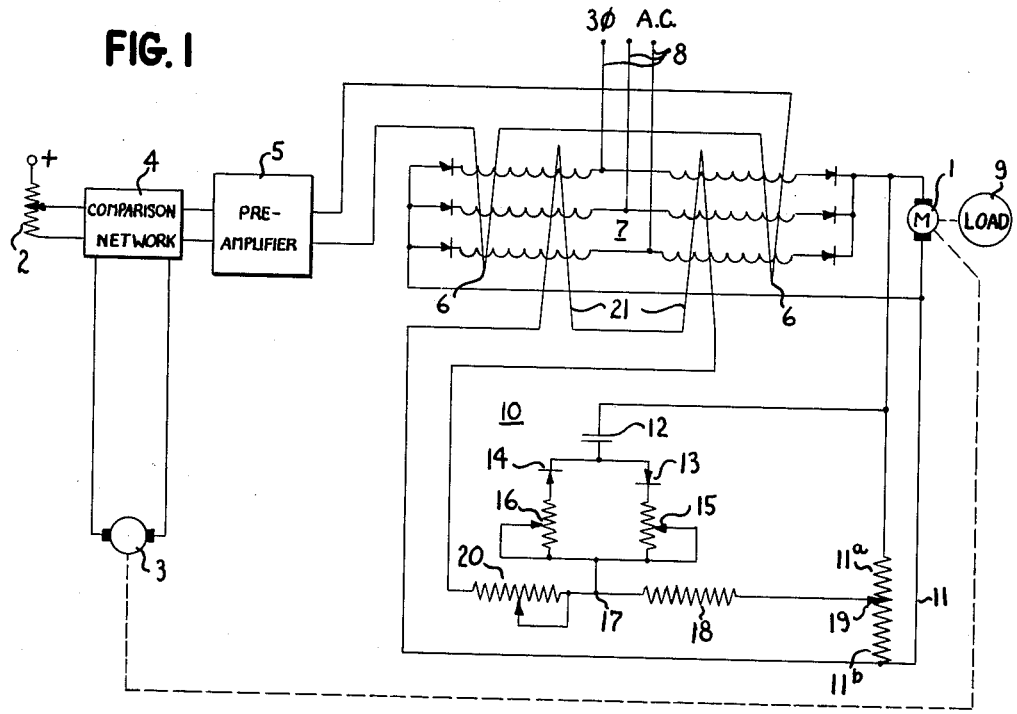
FIGURE 1 illustrates a speed regulated drive system for a dynamo-electric machine which incorporates my invention.

Referring now to FIG. 1, I show a speed regulated drive system for a dynamoelectric machine which comprises a motor 1 whose speed is set in accordance with a speed reference quantity such as a reference voltage derived from potentiometer 2 connected to a voltage source, not shown. The speed reference signal is compared with a signal indicative of the actual speed of motor 1, which may be derived from a tachometer 3 driven by motor 1, in a comparison circuit 4 and a resultant speed error signal is applied to a preamplifier 5 which may be of any suitable form such as a magnetic amplifier, an electron tube amplifier or a semiconductor amplifier of the type disclosed in the copending application of Richard W. Wolke and Ernest F. Kubler, Serial No. 847,925, filed October 22, 1959, and assigned to the same assignee as this application. The comparison network 4 may also be of the type disclosed in the copending application.

The preamplifier 5 supplies a signal in response to the magnitude of the error signal to a control means on a non-regenerating amplifier such as control windings 6 on magnetic amplifier 7. The magnetic amplifier 7 receives three-phase alternating current energy from a source, not shown, through terminals 8, and supplies unidirectional energy to the armature circuit of motor 1. Motor 1 which drives a load 9 may have a separately excited field circuit, not shown. The overall drive system so far discussed is well known to those skilled in the art and by itself forms no part of the present invention.

In accordance with my invention in one form thereof, I provide unsymmetrical stabilizing means in a negative feedback loop 10 about the power amplifier 7 to modify the output of the power amplifier in accordance with an operating characteristic of the motor 1 to stabilize the drive system. In the illustrated embodiment, the characteristic which is sensed and applied to the feedback circuit is motor voltage which is indicative of motor speed plus IR drop. The motor voltage appears across potentiometer 11 and is also applied to capacitor 12. In series with the capacitor is a parallel arrangement of oppositely poled diode-resistance combinations comprising diodes 13 and 14 and resistors 15 and 16 respectively. The opposite terminal 17 of the parallel diode-resistor arrangement is connected to a resistor 18 and hence to a variable tap 19 on potentiometer 11. Also connected to point 17 is a variable resistor 20 and the feedback control winding 21 of magnetic power amplifier 7. The feedback control winding 21 is so poled that increase in current therethrough decreases the output of magnetic amplifier 7.

Under steady state conditions a current is supplied to the feedback control winding 21 dependent on the voltage across portion 11b of potentiometer 11 which principally determines the feedback ratio, and the value of resistors 18 and 20. Resistor 15 is selected to have a low value of resistance with respect to resistor 16. Should load suddenly be removed from the motor, speed of the motor will rapidly increase. A resulting speed error signal will be developed in comparison circuit 4 and applied through preamplifier 5 to control winding 6 on amplifier 7 to turn power amplifier 7 off and reduce the output voltage thereof. Capacitor 12, which had charged to the steady state voltage value, will discharge through portion 11a of potentiometer 11, resistor 18, resistor 16, and unidirectional conducting device 14 to produce a current in feedback winding 21 on power amplifier 7 tending to oppose the change of output voltage of power amplifier 7 and slow response of motor speed. However, with resistor 16 relatively large, a major portion of the capacitor voltage discharge appears across resistor 16 and therefore has little effect on the feedback current through winding 21. Therefore, on "turn off" of the power amplifier, the stabilizing network has little effect to slow the response time of amplifier 7 to the error signal derived from comparison network 4 and the output of power amplifier 7 is rapidly reduced or cut off.

Since the power amplifier 7 is non-regenerating, speed of the motor may be decreased only by allowing the speed to coast down. As the motor speed decreases, the error signal decreases and when a predetermined speed is reached the error signal will turn the power amplifier on. By design the motor speed is allowed to slightly undershoot the regulated speed in order to obtain optimum damping of the motor speed variations. Should the motor speed be controlled to return to the regulated value without undershooting, the response time necessary to achieve the regulated speed would be undesirably long. This condition may be described as overdamped regulation.

As the motor speed reaches the regulated value, or some predetermined value close to the regulated value, the error signal turns on the power amplifier to supply power to the motor armature circuit. Due to the high gain of the drive system a small change in the error signal may turn the power amplifier full on delivering a surge of power to the motor which will again cause overacceleration. However, any sudden change in output voltage of power amplifier 7 causes charging current to flow into capacitor 12 and then decrease exponentially at a rate determined by the capacitance of capacitor 12, the resistance of resistor 15 and the effective resistance of parallel resistors 18 and 20. This rapid charging of capacitor 12 in response to an increase of voltage at the motor terminals produces a current in windings 21 tending to decrease the output of amplifier 7 and thereby controls or cushions any surge of power to the armature circuit of motor 1, thus negating a resulting speed overshoot.

The operation of the unsymmetrical stabilizing network described decreases the speed undershoot of the motor upon load removal, and causes the motor speed to return to the regulated value with a minimum of speed hunting.

Assume now that motor speed has returned to its regulated value, the capacitor 12 charges to a value equal to the motor voltage. If the motor should now be suddenly loaded, it will tend to decrease in speed to pick up the load. A positive going error signal is developed in comparison network 4, causing a current through control winding 6 on power amplifier 7 which increases the voltage output of amplifier 7 to bring the motor back up to regulated speed. The turn on error signal may be sufficient to turn the power amplifier full on, which would result in a surge of power to motor 1, which would tend to overaccelerate the motor. If the output voltage of amplifier 7 starts to rise rapidly, charging current will flow into capacitor 12 and decay at a rate determined by the values of resistors 15, 18 and 20. Charging of capacitor 12 produces a current in windings 21 which opposes in effect the control current in winding 6, tending to increase the power output of amplifier 7. The flow of current in windings 21 decreases exponentially as capacitor 12 charges, thus cushioning the change of output voltage of amplifier 7 to the value demanded by the new load condition and permits steady state operation at the regulated speed to be achieved in a minimum time with a minimum of undershoot and overshoot.

It may readily be seen that the selection of the values of the resistors utilized in the stabilizing network control the magnitude and time rate of application of stabilizing currents through feedback windings 21 and the values of these resistance elements, together with the capacitance of capacitor 12 may be pre-selected in accordance with other parameters of the drive system to achieve the desired results. Although I have illustrated the power amplifier for ease of illustration as a magnetic amplifier, it will be apparent that this invention is equally applicable to any one-way amplifier incapable of receiving regenerative power. Examples of other such amplifiers are ignitrons and eddy current couplings. In the case of an eddy current coupling, the drive shaft would not ordinarily be driving a dynamoelectric machine.

The stabilizing network 8 provided in the negative feedback loop about amplifier 7 may be termed a lead network. In some applications a positive feedback loop or lag network about an amplifier to increase gain and response of the amplifier is utilized in regulated speed drives. When such positive feedback is utilized, it is undesirable to have a signal having a short rise time regenerated in the amplifier inasmuch as such a regenerated signal would undoubtedly adversely contribute to the stability problem. The present invention is also applicable for incorporation in a positive or regenerative feedback loop to contribute to stabilization of the loop.

Figure 2:
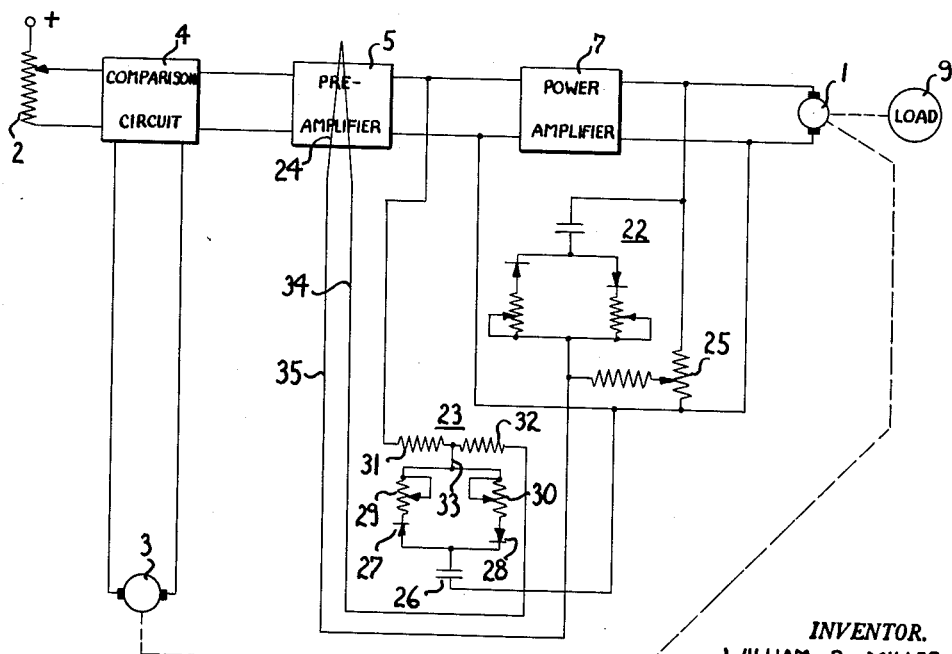
FIGURE 2 illustrates a speed regulated drive incorporating a second embodiment of my invention.

In FIG. 2 I show another embodiment of my invention in a control system in both positive and negative feedback loops. The particular system in which my invention is incorporated, as illustrated in FIG. 2, is designed to maintain a normally non-linear output characteristic of an amplifier, linear with respect to a control signal input to the drive system. This control system is disclosed and claimed in the copending application of James Long and W. R. Miller, Serial No. 737,436, filed May 23, 1958, and assigned to the same assignee as the present application.

Briefly stated, the referenced application discloses a control system wherein regenerative feedback around one linear amplifying element is compared with degenerative feedback around a second non-linear amplifying element, the regenerative feedback being attenuated by a factor equal to the forward gain of the linear element, and a differential signal resulting from the comparison which is indicative of the non-linearity is applied to the input of the control system which transmits a corrective signal to the normally non-linear amplifying element to modify its output.

In FIG. 2 such a system is illustrated incorporating the present invention in both negative and positive feedback loops. The basic drive system elements, namely, signal reference source, speed reference comparison circuit, preamplifier, power amplifier, motor and load bear the same identifying numerals as used in FIG. 1. Stabilization of the negative feedback circuit is accomplished by a network 22 similar to the network 10 of FIG. 1. Additionally, a second unsymmetrical stabilizing network, in this application a lag network 23, is provided in a regenerative feedback loop about preamplifier 5, which in this application, for purposes of illustration and explanation, may be regarded as a magnetic amplifier having a feedback control winding 24 thereon. Under steady state conditions, the voltage output of preamplifier 5 is compared with an attenuated output voltage of power amplifier 7 in control winding 24 on preamplifier 5. The feedback signal from the output of amplifier 7 is attenuated a predetermined amount by potentiometer 25. The unsymmetrical stabilization circuit 23 comprises a capacitor 26 in series with a parallel arrangement of oppositely poled diode-resistor arrangements. The diodes 27 and 28 have series resistors 29 and 30 respectively associated therewith. The values of the resistors 29 and 30 are so chosen that resistor 29 has a higher value of resistance than resistor 30. Under steady state conditions, a feedback current is applied to a positive feedback control winding 24 through resistors 31 and 32 which are serially connected at point 33. Upon the application of an increasing signal to preamplifier 5 which may be due to a sudden increase in a speed error signal from comparison circuit 4, the output of preamplifier 5 will increase and the voltage increase appearing at point 33 will be initially shunted across resistor 30, unidirectional conducting device 28 and capacitor 26 to prevent this suddenly increasing signal from being regenerated in preamplifier 5. The voltage at point 33 will then rise exponentially with a time determined by the product of the resistance of resistors 30 and 31 and the capacitance of capacitor 26, thereby producing a corresponding exponentially increasing current in line 34 to control winding 24. This controlled increase in the positive feedback signal prevents the possibility of a too rapid increase in the signal applied to power amplifier 7.

Again assuming steady state conditions, capacitor 26 charges through resistors 31 and 30 and unidirectional conducting device 28 to a voltage determined by the steady state voltage appearing at the output of preamplifier 5. Should there now be a decrease in the output voltage of preamplifier 5, capacitor 26 will discharge through unidirectional conducting device 27 and resistor 29, resistor 32 and into control winding 24, exponentially decreasing the current therethrough in a time determined by the product of the capacitance of capacitor 26 and the resistance of resistors 29 and 32 to apply a current through winding 24 to oppose the decrease in the output voltage of preamplifier 5. Since resistor 29 is large, most of the voltage drop will appear in resistor 29 and not delay the action of the positive feedback. This permits preamplifier 5 to turn off rapidly which is desirable for optimum performance.

As illustrated in FIG. 2, the feedback current appearing in winding 24 is a differential signal indicative of the difference in feedback signals from networks 22 and 23.

It may thus be seen that my invention is also applicable to a lag stabilization network, and although I have illustrated it in a lag network a particular control system in conjunction with a lead network embodying my invention, it will be apparent that such a lag network will find application other than in conjunction with a lead network.

The stabilizing network of my invention provides steady state feedback together with controlled transient feedback which is unsymmetrical in time with respect to oppositely directed transients.

Although I have illustrated and described my invention in regulated drive systems for dynamoelectric machines utilizing specific amplifying elements, it is to be understood that the invention is not limited to the drive systems illustrated for purposes of disclosure. Other applications, changes and modifications may occur to those skilled in the art without departing from the spirit and scope of this invention. Accordingly, it is my intention to cover all changes and modifications of the examples of the invention herein chosen for purposes of disclosure which do not constitute departure from the spirit and scope of the invention.

What I claim as new and desire to secure by Letters Patent of the United States is:

1. In an arrangement for regulating the speed of a dynamoelectric machine including a unidirectional amplifying system, having control means, for supplying electrical energy to a circuit of the dynamoelectric machine in accordance with a reference signal applied to the control means, means for stabilizing the speed of the dynamoelectric machine comprising means for sensing a signal indicative of changes in an operating characteristic of the dynamoelectric machine, feedback means for applying the sensed signal to a control means in the amplifying system to modify the output of the amplifying means, said feedback means being effective to discriminate between directions of change of said sensed signal and further effective to selectively control the rate of application of the sensed signal applied to said control means dependent on the direction of change of the sensed signal, the rate of application of the sensed signal to said control means being unsymmetrical with respect to direction of change of the sensed signal.

2. An unidirectional amplifying system for supplying electrical energy to a dynamic load wherein the load may vary in opposite directions from a given value, said amplifying system having control means for controlling the electrical energy supplied to the load, means to stabilize the amplifying system upon load variations comprising: means to sense an output characteristic of said amplifying system which is affected by load variations, means to feed back a signal indicative of the sensed characteristic to said control means to modify the output of said amplifying system, means responsive to rapid changes in the indicative signal to control the rate of application of changing indicative signals to said control means, said last-mentioned means being effective to discriminate between directions of change of said indicative signals the magnitude and rate of application of the indicative signals applied to said control means being unsymmetrical with respect to direction of change of the characteristic.

3. The amplifying system of claim 2 wherein the stabilizing means comprises a capacitor adapted to charge to the value of the armature voltage under steady state conditions, a discharge circuit for said capacitor for applying a stabilizing signal to said control means upon decrease in armature voltage, a charging circuit for said capacitor for applying a stabilizing signal to said control means upon increase in the armature voltage, the time constant of said charging circuit being less than the time constant of said discharge circuit.

4. In combination, a speed regulated drive for a direct current motor comprising a unidirectional amplifying system for supplying electrical energy to the armature circuit of said motor, said amplifying system having control means, means to derive a speed reference signal, means to derive a signal indicative of the actual speed of said motor, means to compare the reference signal and the indicative signal to derive a speed error signal and apply the error signal to said control means to control the electrical energy supplied to said armature circuit, a stabilizing network, said stabilizing network comprising means to sense changes in the voltage across said armature circuit and being effective to discriminate between directions of change in the armature voltage, said stabilizing network comprising feedback means for applying a signal indicative of the sensed change in armature voltage to said control means and being further effective to selectively control the rate of application of the indicative signal dependent on the direction of change of the armature voltage, the rate of application of the indicative signal being unsymmetrical with respect to the direction of change of the armature voltage.

5. The arrangement of claim 4 wherein the stabilizing network comprises a capacitor adapted to charge to the value of the armature voltage under steady state conditions, a discharge circuit for said capacitor for applying a stabilizing signal to said control means upon decrease in armature voltage, a charging circuit for said capacitor for applying a stabilizing signal to said control means upon increase in the armature voltage, the time constant of said charging circuit being less than the time constant of said discharge circuit.

References Cited in the file of this patent
UNITED STATES PATENTS
2,235,551    Garman _____ Mar. 18, 1941

UNITED STATES PATENT OFFICE
CERTIFICATE OF CORRECTION

Patent No. 3,046,464 July 24, 1962

William R. Miller

It is hereby certified that error appears in the above numbered patent requiring correction and that the said Letters Patent should read as corrected below.

Column 6, line 74, for "signals" read -- signal, --.

Signed and sealed this 4th day of June 1963.

(SEAL)
Attest:

ERNEST W. SWIDER
Attesting Officer

DAVID L. LADD
Commissioner of Patents